Patented Mar. 26, 1940

2,195,386

UNITED STATES PATENT OFFICE 2,195,386

UNSATURATED ETHERS OF DIOXAN

Edgar C. Britton and Harold R. Slagh, Midland, Mich., assignors to The Dow Chemical Company, Midland, Mich., a corporation of Michigan No Drawing. Application October 12, 1937, Serial No. 168,622

4 Claims. (Cl. 260—338)

The present invention relates to unsaturated ethers of dioxan having the general formula:

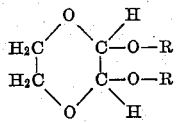

wherein R is an organic hydrocarbon radical containing at least one ethylenic linkage in an aliphatic chain. These new compounds are in most instances colorless mobile liquids with moderately high boiling points. They are useful as solvents for a variety of materials and as modifying agents in the polymerization of vinyl compounds, particularly styrene.

These new ethers may be prepared by reacting 2,3-dichlorodioxan with an alcohol containing at least one ethylenic linkage, e. g. allyl alcohol, geraniol, cinnamyl alcohol, furfuryl alcohol, etc. In carrying the reaction out I prefer to use one mol of 2,3-dichlorodioxan and an excess, e. g. 2 to 10 mols, of the alcohol, although other proportions may be employed. The agents are mixed and heated at a moderate temperature, e. g. 50° to 200° C., for several hours until evolution of the hydrogen chloride formed during the reaction ceases. The excess alcohol is then boiled off and the residual liquid is fractionally distilled at reduced pressure to separate the dioxan-diether.

In preparing certain unsaturated diethers, e. g. di-(methallyl oxy)dioxan, by the procedure just described, a portion of the unsaturated alcohol reactant may undergo side-reactions with the hydrogen chloride formed in the principal reaction. Because of these side-reactions the yield of dioxan-diether is materially reduced. In such instances, therefore, it is preferable to prepare the desired diether by reacting 2,3-dichlorodioxan with an alkali metal salt, e. g. a sodium or potassium salt, of the unsaturated alcohol. In this way the formation of hydrogen chloride is avoided and the yield of dioxan-diether is greatly improved.

The following example illustrates one way in which the principle of the invention has been employed but is not to be construed as limiting the scope thereof:

Example 1

A mixture of 79 grams of 2,3-dichlorodioxan and 174 grams of allyl alcohol was heated under reflux at a temperature between about 95° and about 110° C. for 2 hours. The reaction mixture was then fractionally distilled at reduced pressure, the fraction distilling at temperatures between 104° C. at 0.2 inch absolute pressure and 105° C. at 0.5 inch pressure being collected. This fraction consisted of 64 grams of di-(allyloxy)-dioxan, the formula of which is:

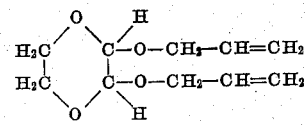

a colorless mobile liquid having a specific gravity of 1.100 at 25°/25° C. and a refractive index of 1.4604 at 20° C.

Among the other unsaturated 2,3-diethers of dioxan which may be prepared in accordance with the procedure hereinbefore described are the compounds: di-(methallyloxy)dioxan, di-(crotyloxy)dioxan, di-(citronellyloxy)dioxan, di-(geranyloxy)dioxan, di-(cinnamyloxy)dioxan, di-(furfuryloxy)dioxan, etc.

Other modes of applying the principle of the invention may be employed, change being made as regards the details herein disclosed, provided the product stated by any of the following claims or the equivalent of such stated product be employed.

We therefore particularly point out and distinctly claim as our invention:

1. An unsaturated either of dioxan having the general formula

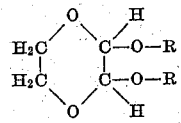

wherein R is an organic hydrocarbon radical containing at least one ethylenic linkage in an aliphatic chain.

2. An unsaturated ether of dioxan having the general formula

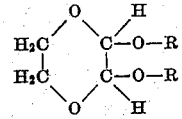

wherein R is an aliphatic radical containing at least one ethylenic linkage.

3. Di-(allyloxy)dioxan, a colorless mobile liquid having a boiling point of about 104° C. at 0.2 inch absolute pressure to about 105° C. at 0.15 inch pressure, a specific gravity of about 1.100 at 25°/25° C., and a refractive index of about 1.4604 at 20° C.

4. An unsaturated ether of dioxan having the general formula
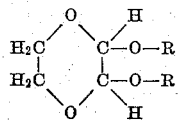
wherein R is an organic hydrocarbon radical selected from the class consisting of the allyl, methallyl, crotyl, citronellyl, geranyl, and cinnamyl radicals.
EDGAR C. BRITTON.
HAROLD R. SLAGH.